United States Patent [19]

Horai et al.

[11] 3,785,798

[45] *Jan. 15, 1974

[54] BIOLOGICALLY ACTIVE PARTICULATE MATERIAL AND THE PROCESS FOR MANUFACTURING SAME

[75] Inventors: John C. Horai, Hagerstown; Stephen F. Tucker, Clear Spring, both of Md.

[73] Assignee: GAF Corporation, New York, N.Y.

[ * ] Notice: The portion of the term of this patent subsequent to Feb. 2, 1988, has been disclaimed.

[22] Filed: Oct. 19, 1970

[21] Appl. No.: 82,160

Related U.S. Application Data

[63] Continuation-in-part of Ser. No. 633,718, April 26, 1967, Pat. No. 3,560,196.

[52] U.S. Cl.................... 71/79, 71/DIG. 1, 424/24
[51] Int. Cl............................................... A01n 9/00
[58] Field of Search................... 71/DIG. 1, 115, 79, 71/120, 118, 111, 93; 424/24

[56] References Cited

UNITED STATES PATENTS

| 2,614,051 | 10/1952 | Buzzell | 117/27 |
| 3,560,196 | 2/1971 | Honai | 71/115 |
| 3,617,246 | 11/1971 | Duyfjes | 71/79 |
| 3,617,244 | 11/1971 | Jones | 71/DIG. 1 |

FOREIGN PATENTS OR APPLICATIONS

| 589,926 | 12/1959 | Canada | 71/DIG. 1 |

Primary Examiner—James O. Thomas, Jr.
Attorney—Walter C. Kehm and Samson B. Leavitt

[57] ABSTRACT

Biologically active particulate material capable of releasing a biochemical at a controlled rate due to the change of environmental conditions, is manufactured by coating granules in the range of 10 to 50 mesh with a biochemical and a silicate binder and thereafter partially insolubilizing the binder.

6 Claims, No Drawings

BIOLOGICALLY ACTIVE PARTICULATE MATERIAL AND THE PROCESS FOR MANUFACTURING SAME

This application is a continuation-in-part of our application Ser. No. 633,718 filed April 26, 1967, now U.S. Pat. No. 3,560,196.

BACKGROUND OF THE INVENTION

I. Field of the Invention

This invention relates to biologically active particulate materials capable of releasing a biochemical at a controlled rate due to the change of environmental conditions. The invention also relates to the process for manufacturing said particulate materials. The biochemicals referred to in this specification include toxicant compositions which are effective, for example, for killing or controlling the growth of plants, insects, micro-organisms, fungi, and bacterias and also include chemicals which are repugnant to animals. These chemicals are generally referred to as pesticides, being inclusive of herbicides, insecticides, bactericides, fungicides, repellents, etc.

II. Background of the Invention

Biologically active materials such as pesticides are commonly used in the forms of a spray or a dust and more recently, they have become available commercially in the form of dry granules. The use of biologically active materials in the form of dry granules has many advantages over the more conventional spray or dust. Their use, for example, eliminates the problem of drift associated with the application of dust and spray. The application of dry granules is simple and rapid and adaptable for use in efficiently controlled machinery, such as hoppers equipped with a pre-set rate gauge and the dry granules provide better through-foliage penetration reaching the water or land being treated. Furthermore, the dry granular materials are premixed and ready to be used, thus eliminating the inconvenience of on-the-site mixing and measuring. They can be applied simultaneously with cultivation, seeding or fertilizing hence lowering the application time and costs. The dry granules may also contain one or more biochemicals with different biological activities.

Heretofore biologically active granules were produced by incorporating the toxicant, in or upon pelletized powders such as Fuller's earth, attaclay, pumice, calcined diatomaceous earth and chemical compounds. The release of the toxicant is based generally on the porosity of the granule or on the disintegration of the granule in the presence of water with or without the presence of swelling agents therein, or on the combination of both. Release based on these methods is not completely satisfactory because it does not provide the release of toxicants at a controlled rate for effective treatment of the area for extended periods of time while still providing a fast enough release for the immediate control.

SUMMARY OF THE INVENTION

We have found that disadvantages of the prior biologically active granules can be substantially overcome by the particulate material of this invention. Broadly stated, the biologically active particulate material of this invention comprises a granular carrier having coated thereon a biochemical and a partially insolubilized silicate binder. Advantageously, the particulate material is prepared by mixing a granular carrier with a biochemical and a silicate binder to provide a coating on the carrier and thereafter drying or chemically reacting the thus coated granules to partially insolubilize the silicate binder.

The biologically active particulate material of this invention is capable of releasing the biochemical at a controlled rate upon the change of environmental conditions such as those normally encountered by the herbicides and pesticides. Preferably, the release of the biochemical is initiated by rainfall or humidity or by the change of temperature. We have discovered that by varying the thickness and the solubility of the silicate binder, it is possible to provide biologically active particulate material which will provide immediate release of biochemicals for adequate control of undesirables in the areas to be treated and still maintain a sustained release of the biochemicals for an extended period of time.

DESCRIPTION OF THE PREFERRED EMBODIMENTS

A number of natural and artifical granules can be used as carriers for the biologically active particulate material. Preferably a dense mineral granule is used. Suitable mineral granules, for example, are diabase, calcite, basalt, limestone, and greenstone rhyolite. The granular carriers preferably are graded and have a size in the range between 10 and 50 mesh. Size above or below the preferred range, however, can also be used.

The biochemicals used to coat the carrier can be any suitable chemical with biological activities. For example, they may be selected from the large groups of compositions approved by the U. S. Department of Agriculture and/or otherwise well known as insecticides, herbicides, fungicides, bactericides, repellents, and the like such as amiben acid (3-amino-2,5-di-chlorobenzoic acid), chloro IPC (isopropyl-N-(3-chlorophenyl)-carbamate), Casaron W-50 (dichlorobenzonitrile), dipotassium endothal (dipotassium-3,6-endohexahydrophthalate), D.D.T.; Dieldrin (1,2,3,4,10,10-hexachloro-exo-6,7-epoxy-1,4,4*a*,5,6,7,8,8*a*-octahydro-1,4-endo,exo-4,8-dimethanonaphthalene); sesone (sodium2,4-dichlorophenoxyethyl sulfate); malathion (S-(1,2-dicarbethoxyethyl)-0,0-dimethyl phosphorodithioate) and parathion (0,0-diethyl O-p-nitrophenyl phosphorothioate), Linuron (3-(3,4-dichlorophenyl)-1-methoxy-1-methylurea, Atrazine (2-chloro-4-ethylamino-6-isopropylamino-S-triazine), Furadan (2,3-dihydro-2,2-dimethyl-1,7-benzofuranyl methyl carbamate), Banvel D (2-methoxy-3,6-dichlorobenzoic acid), Pyramin (5-amino-4-chloro-2-phenyl-3(2H)-pyridazinone), Ramrod (2-chloro-N-isopropylacetanilide), p-dichlorobenzene, and the like.

The amount of biochemicals (pesticides) to be used in preparing the biologically active particulate material of this invention depends on a number of factors. In general, the biological activity of the resultant material increases with increasing amounts of biochemicals. The rate of release, however, is dependent to a large extent on the silicate binder as will be discussed hereinbelow in greater detail. We found as little as 1% of biochemical based on the weight of the granules will provide beneficial biological activities for certain controls. It is advantageous, however, to use between 3 percent to 20 percent based on the weight of granules.

The silicate binder used for coating, preferably is an alkali silicate. For some applications, potassium silicate is more suitable because agriculturally used land has greater tolerance for potassium ion than the sodium ion. Other types of silicates which can be insolubilized readily and do not adversely affect the biological activities of the biochemicals used are also suitable.

The amount of silicate binder to be used for coating is determined by the desirable biochemical release rate and the extent of the insolubilization. A sufficient amount must be used to bond the biochemical and to provide a coating on the carrier. A higher degree of insolubilization will provide a slower release of biochemicals, and less insolubilization, a higher rate. By varying the degree of insolubilization, it is possible to control the release of the biochemical of the particulate material of this invention.

The partial insolubilization of the silicate binder may be carried out by heating to a temperature below the range which will substantially adversely affect the biological activity of the chemical. For heat sensitive biochemicals, chemical insolubilization can be used. Acid pickling agents such as ammonium chloride, aluminum chloride, calcium chloride, hydrochloric acid can be used in the partial insolubilization process. In some instances where the toxicant is a salt of calcium or that of an acid, it will, in itself, partially insolubilize the silicate film. In such cases, controlled solubility is accomplished by regulating the amount of silicate used.

In manufacturing the particulate material of this invention, the graded mineral granules are first coated with the biochemical in any suitable manner and thereafter the silicate solution is applied thereon. Partial insolubilization may be achieved by drying the thus coated granules at a controlled temperature. Alternatively, the biochemical, in some instances, is advantageously coated on the granular carrier simultaneously with the silicate binder.

As stated hereinabove, the solubility of the silicate film regulates the release of the active agent. Since the solubility of the film can be controlled by its thickness, by degree of drying at temperatures tolerable by the particular toxicant used, and by various concentrations of pickling agents, biologically active granules may be custom tailored for a variety of applications. Furthermore, for special applications, two or more layers of silicate coating can be used to bond one or more biochemicals onto the carrier.

Further to illustrate this invention, specific examples are described hereinbelow. In these examples, particulate material of this invention with three different release rates identified hereinbelow as fast release, intermediate release and slow release granules, were prepared and their control release and biological activities were compared with standard attaclay granules containing an equal amount of amiben.

EXAMPLE 1

Fast Release Granules

In preparing the fast release coating one ton of crushed and graded dry greenstone granules passing a 20 mesh screen and retained on a 40 mesh screen is mixed with 100 pounds of a herbicide, amiben acid (3-Amino-2,5-dichlorobenzoic acid) in a tumbling barrel type mixer until the granules are coated with the herbicide. Then 80 pounds of Kasil No. 1 (potassium silicate with $K_2O:SiO_2$, ratio of 1:2.50 supplied by the Philadelphia Quartz Company) diluted with 25 pounds of water are mixed with the ambien coated granules until the granules are uniformly coated. At the end of the mixing cycle the coated granules are dried at a temperature of 150°F.

EXAMPLE 2

Intermediate Release Granules

In preparing an intermediate release type coating, formula and method are the same as cited in Example 1 except the amount of Kasil is decreased to 40 pounds and the water to 10 pounds per ton.

EXAMPLE 3

Slow Release Granules

In preparing slow release coatings, composition and method are the same as in Example 2 except after drying, the coated granules are post treated with 5 pounds of a 28% aluminum chloride solution.

To show the biological activity and controlled release rates of the granules of the present invention, slow, intermediate and rapid release granules prepared according to Example Nos. 1, 2 and 3 were evaluated in the greenhouse using Wong Barley as a bioassay and the release of amiben from granules was determined using a modification of Sutherland's method (WSA Abstracts, 1964). The bioassay was conducted in the greenhouse in 4 inch plastic pots with unsterilized soil. Wong Barley was used as a bioassay. Formulated granules were applied to give 4 pounds amiben per acre and were covered with 0.25 inches of sand. One complete set of treatments including untreated controls was leached with 3 inches of water, applied with a hose and sprinkler in 0.5 inch increments. Ten barley seeds were planted in each pot immediately after leaching. Barley tops were harvested and weighed three weeks after planting.

Release of amiben from granules was studied using a modification of Sutherland's method. Whatman No. 1 filter paper discs, 8cm, were placed in 10 cm plastic petri dishes and moistened with 1 ml of distilled water each. Sufficient granules to give 2 mg amiben ($\approx 3.6$ pounds per acre) were distributed on each filter paper and exposed for 2 hours. The filter papers were dried and extracted, and the extracts were analyzed colormetrically for amiben.

A comparison of release rates and biological activity of the coated granules are presented in Table No. I.

TABLE NO. I

| Herbicide Formation | (a) Release Rate | (b) Barley Response |
| --- | --- | --- |
| Control | 100 | 100 |
| Attaclay Granules | 76 | 85 |
| Fast Release Granules | 30 | 32 |
| Intermediate Release Granules | 17 | 40 |
| Slow Release Granules | 15 | 27 | a. Percent release of active ingredient during 2 hours exposure to a wet filter paper.

b. Barley fresh weight as a percent of controls with barley planted immediately after leaching and harvested 3 weeks later.

Release of amiben from the slow, intermediate and fast controlled release granules prepared according to the methods disclosed in the specific examples were also studied in an aqueous media. Granule under study which included standard attaclay control granules containing 0.2 grams of amiben were immersed in distilled water for periods extending to 18 days. Periodically the solutions were analyzed colormetrically for amiben to determine release rates as a function of time. Data obtained is tabulated in Table No. II.

TABLE NO. II

| Soak Time Days | Attaclay | Slow | % Amiben Released Intermediate | Fast |
|---|---|---|---|---|
| 4 | — | 44 | 50 | 62 |
| 8 | — | 60 | 68 | 82 |
| 11 | — | 78 | 86 | 100 |
| 16 | — | 94 | 100 | — |
| 18 | — | 100 | — | — |
| 15 hr. | 100 | — | — | — |

In the examples in the following Table No. III, in which the indicated amounts refer to pounds, 1 ton of crushed and graded mineral granules passing a 24 mesh screen and retained on a 48 mesh screen is mixed with the indicated amount of pesticide in a tumbling barrel type mixer until the granules are uniformly coated with the pesticide. Then the indicated amount of silicate and water, in solution form, is mixed with the coated granules until a uniform coating of silicate solution is obtained. The coated granules are then dried with an air stream at 90°F., post treated with the indicated amount of 28% aluminum chloride pickling solution, and the coated and pickled granules then dried. In each case, the products exhibit the desired pesticidal function by slow or delayed release of the indicated herbicide, insecticide, fungicide, bactericide, and/or repellent (animal, moth, etc.) and the like.

to herein and in the appended claims are by weight unless otherwise indicated.

This invention has been disclosed with respect to certain preferred embodiments, and it will be understood that modifications and variations thereof will become obvious to persons skilled in the art and are intended to be included within the spirit and purview of this application and the scope of the appended claims.

We claim:

1. A process for manufacturing particulate material capable of releasing a pesticide at a controlled rate which comprises mixing mineral granules having a size in the range of 10 to 50 mesh with a pesticidally effective amount of a pesticide, then admixing the thus coated granules with an alkali silicate solution, and partially insolubilizing the silicate by reacting it with an acidic pickling composition.

2. The process of claim 1 employing dense mineral granules having a size in the range between 10 and 40 mesh.

3. The process of claim 1 wherein the acidic pickling composition contains as the active acid pickling agent a member selected from the group consisting of ammonium chloride, aluminum chloride, calcium chloride, hydrochloric acid, and mixtures thereof.

4. The process of claim 3 wherein the acid pickling agent is aluminum chloride.

5. The process of claim 4 employing dense mineral granules having a size in the range between 10 and 40 mesh.

6. The process of claim 5 employing one ton of the dense mineral granules, 100 pounds of the pesticide, 40 to 80 pounds of potassium silicate having a ratio of $K_2O:SiO_2$ of 1:2.50 and 10 to 25 pounds of water as the alkali silicate solution, 5 pounds of 28% aluminum chloride solution as the acidic pickling composition, and the silicate coated granules are dried at about 150°F. prior to reacting same with the acidic pickling composition.

TABLE NO. III

| Ex. | Sodium Silicate N* | Kasil No. 1 | Pesticide | Pesticide Amount | Water | AlCl₃ |
|---|---|---|---|---|---|---|
| 4 | 90 | — | Linuron | 100 | 55 | 2.5 |
| 5 | 90 | — | Altrazine | 100 | 55 | 2.5 |
| 6 | 90 | — | Furadan | 100 | 55 | 5.0(+30 water) |
| 7 | — | 90 | Casoron | 100 | 55 | 2.5(+30 water) |
| 8 | — | 90 | Fenac | 100 | 55 | 2.5(+30 water) |
| 9 | — | 40 | Banvel D | 100 | 60 | 5.0(+30 water) |
| 10 | — | 40 | Ramrod | 100 | 60 | 5.0(+30 water) |
| 11 | — | 40 | Chloro IPC | 100 | 60 | 7.5(+30 water) |
| 12 | 90 | — | Vapam** | 100 | 55 | 5.0(+30 water) |
| 13 | — | 40 | Terraclor*** | 100 | 60 | 7.5(+30 water) |
| 14 | — | 90 | 2-Undecanone | 100 | 55 | 2.5(+30 water) |

*$Na_2O:SiO_2$ ratio of 1:3.25
**sodium N-methyl dithiocarbamate
***pentachloro nitrobenzene It will be further understood that in the present specification all the examples herein are only illustrative of the invention, and that parts and proportions referred